Nov. 4, 1930.  A. A. CANTON  1,780,338
COMBINATION MOTOR AND PUMP
Filed Dec. 31, 1928
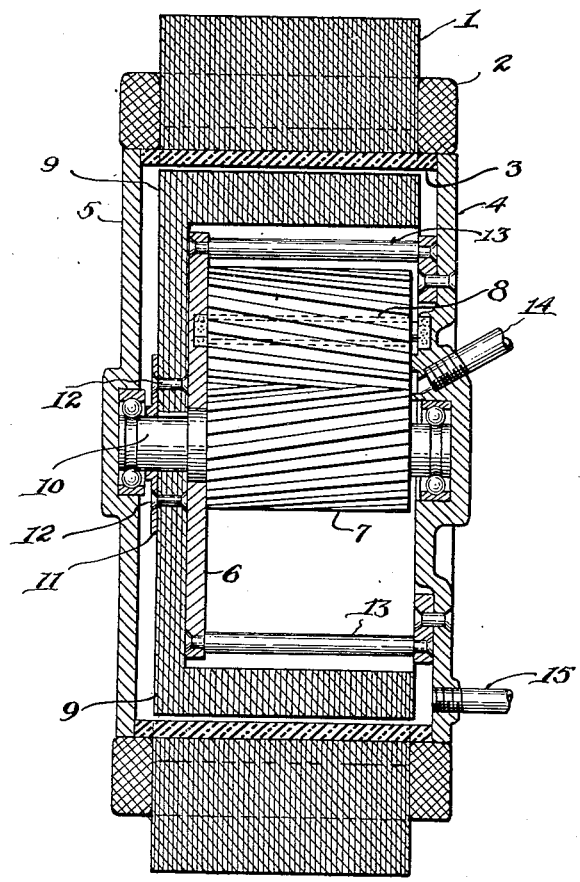
INVENTOR
Allen A. Canton Patented Nov. 4, 1930

1,780,338

UNITED STATES PATENT OFFICE

ALLEN A. CANTON, OF NEW YORK, N. Y., ASSIGNOR TO GLACIER, INC., OF THE STATE OF NEW YORK

COMBINATION MOTOR AND PUMP

Application filed December 31, 1928. Serial No. 329,575.

This invention relates to a combination motor and pump. The principal object of the invention is to provide a motor and pump formed in one unit and also to separate the armature and pump from the field so that no gas being pumped by the armature-pump combination can escape through the field.

Another object of the invention is to construct a motor and pump forming a unitary structure.

Another object of the invention is to construct a motor and pump having no packing glands and stuffing boxes through which the fluids being pumped might escape to the atmosphere.

Another object of the invention is to make the armature of a motor act as the pumping element of a rotary compressor and to provide a pump capable of pumping at very high speeds thereby reducing the cost of manufacture by making a smaller unit for a given capacity.

Another object of the invention is to make the armature act as a rotary pump, the armature being enclosed in an airtight field.

Another object of the invention is to so arrange the device that the field can be cooled by either air or water which will not come in contact with the gas.

Other objects will appear as the disclosure progresses. The needs of manufacture may necessitate certain mechanical changes. It is therefore not intended to limit the invention to the embodiment illustrated but rather to define such limits in the appended claims.

In the drawing the figure represents a cross section of the device.

Numeral 9 designates the armature hollowed out to house a gear pump formed of gears 7 and 8 of standard well known construction. Gear 8 rotates in bearings formed in plates 6 and 4 which are locked together by bolts 13.

The gear 7 is fastened to the armature 9 by the shaft 10 and plate 11 which is united to the armature by rivets 12. As the armature 9 rotates the gear 7 rotates with it and drives the gear 8 producing a suction at inlet port 14 and forcing the gas under pressure out through port 15.

The case 3 made of insulating material is embedded in the field laminations 1 as shown in my co-pending application Serial #329,574. The plates or cylinder heads 4 and 5 are made gas tight to the case 3 thus forming a sealed container for the armature pump combination. The heads or plates 4 and 5 also provide means to support the necessary bearings for the gear 7.

This device is particularly of great service for refrigeration and other mechanism where it is essential to prevent gases or liquids from escaping as they would if a separate motor and pump were used and packing glands necessary as practiced at present.

It is obvious that certain modifications of the construction shown may be made. The drawing simply serves to illustrate one method of mounting a pump in an armature. This pump although illustrated as a gear pump may be of any of the standard constructions, either of the eccentric or vane types. It is obvious that by positioning the pump in the armature as shown, a compact combination is accomplished, reducing the power losses due to power transmission means such as belts, cams or gears, and eliminating the vibration and torsion strains due to long shafts.

While one method is shown for sealing the armature airtight into the field it is not the purpose to limit the sealing means to that shown. For example a sealing casing may enclose both the field and armature, or the enclosure may embrace the entire outer circumference of the field and enclosing the field windings. Likewise an insulating cylinder may be inserted between the field and armature to serve as a casing for the armature separating it from the field. Magnetic material may be placed in said cylinder to reduce the magnetic gap.

Having described my invention, I claim:

1. In a device of the class described in combination, a magnetic field element, a revolving armature, a pump housed in said armature, and means for making said armature leak-proof from said field element, said means consisting of a cylindrical casing and a pair of head plates attached to the field element and fully enclosing said armature, bearings in said head plates for said pump, said bearings being fully enclosed and having no opening which leads to the atmosphere.

2. In a device of the class described, a magnetic field element, a revolving armature associated therewith, a pump consisting of two oppositely rotating gears meshing with each other and adapted to revolve in unison housed in said armature, and means for making a leak-proof connection between said armature and said field element, said means consisting of a cylindrical casing and a pair of head plates attached to the field element and fully enclosing said armature, bearings in said head plates for said pump, said bearings being fully enclosed and having no outlet leading to the atmosphere.

3. In a pumping device of the class described, a revolving armature, a magnetic field element surrounding said armature, pumping means housed in said armature, means for enclosing the armature and pumping means and making them leak-proof, said means consisting of a cylindrical casing and a pair of head plates attached to the field element and fully enclosing said armature, bearings in said head plates for the pumping means, said bearings being fully enclosed and having no opening leading to the atmosphere, and means to allow a gas or liquid to enter and leave said enclosure.

4. In a pumping device in combination, a revolving armature, a magnetic field element surrounding said armature, a pump consisting of a pair of oppositely rotating gears meshing with each other housed in said armature, said gears adapted to rotate in unison with the armature, and a pair of head plates attached to the field element and enclosing said armature and pump, bearings in said head plates for said pump, said bearings being fully enclosed and having no opening leading to the atmosphere.

5. In a pumping device in combination, a revolving armature, a magnetic field element surrounding said armature and forming an enclosure having inlet and outlet ports, a pump consisting of two oppositely rotating gears meshing with each other housed in said armature, said gears adapted to rotate in unison with the armature and means for making the enclosing field leak-proof, said means consisting of a cylindrical casing and a pair of head plates attached to the field and fully enclosing said armature and pump, bearings in said head plates for said pump, said bearings being fully enclosed and having no opening leading to the atmosphere.

6. In a device as described, a rotary armature having a hollow cylindrical body closed at one end and open at the other, a cylindrical casing completely enclosing said armature, a shaft journaled in said casing axially thereof and having said armature keyed thereto, a gear pump having a gear member fixed on said shaft within the hollow armature, said gear pump having a second gear member meshing with the first gear member and mounted in the hollow armature to rotate on a fixed axis, and inlet and outlet pipes communicating with the interior of said casing.

7. In a device as described, a rotary armature having a hollow cylindrical body closed at one end and open at the other, a cylindrical casing completely enclosing said armature, a shaft journaled in said casing axially thereof and having said armature keyed thereto, a gear pump having a gear member fixed on said shaft within the hollow armature, a plate within the hollow armature at the closed end thereof, said plate having an opening through which said shaft passes, means attached to the casing adjacent the open end of the armature and fixedly supporting said plate, said gear pump having a second gear member meshing with the first gear member within the hollow armature, a shaft extending through the second gear member and having its ends mounted respectively in said plate and casing, and inlet and outlet pipes communicating with the interior of said casing.

8. In a device as described, a rotary armature having a hollow cylindrical body closed at one end and open at the other, a cylindrical casing completely enclosing said armature, a shaft journaled in said casing axially thereof and having said armature keyed thereto, a gear pump having a gear member fixed on said shaft within the hollow armature, said gear pump having a second gear member meshing with the first gear member and mounted in the hollow armature to rotate on a fixed axis, and inlet and outlet pipes communicating with the interior of said casing, one of said pipes leading into the casing at one end of the gear members and at a point on the line of meshing of said members.

9. In a device as described, a rotary armature having a hollow cylindrical body closed at one end and open at the other, a cylindrical casing completely enclosing said armature, a shaft journaled in said casing axially thereof and having said armature keyed thereto, a gear pump having a gear member fixed on said shaft within the hollow armature, a plate within the hollow armature at the closed end thereof, said plate having an opening through which said shaft passes, means attached to the casing adjacent the open end of the armature and fixedly supporting said plate, said gear pump having a second gear member meshing with the first gear member within the hollow armature, a shaft extending through the second gear member and having its ends mounted respectively in said plate and casing, and inlet and outlet pipes communicating with the interior of said casing, one of said pipes leading into the casing at one end of the gear members and at a point on the line of meshing of said members.

Signed at New York, in the county of New York and State of New York, this 31st day of December, A. D. 1928.

ALLEN A. CANTON.